United States Patent
Myren (10) Patent No.: US 12,510,593 B2
(45) Date of Patent: Dec. 30, 2025

(54) INTEGRATED CIRCUIT TESTING METHOD AND SYSTEM

(71) Applicant: TouchNetix AS, Trondheim (NO)

(72) Inventor: Steinar Myren, Trondheim (NO)

(73) Assignee: TouchNetix AS, Trondheim (NO)

( * ) Notice: Subject to any disclaimer, the term of this patent is extended or adjusted under 35 U.S.C. 154(b) by 181 days.

(21) Appl. No.: 18/551,920

(22) PCT Filed: Mar. 25, 2022

(86) PCT No.: PCT/EP2022/057951
§ 371 (c)(1),
(2) Date: Sep. 22, 2023

(87) PCT Pub. No.: WO2022/207497
PCT Pub. Date: Oct. 6, 2022

(65) Prior Publication Data
US 2024/0175919 A1 May 30, 2024

(30) Foreign Application Priority Data

Mar. 29, 2021 (GB) ..................................... 2104407

(51) Int. Cl.
*G01R 31/317* (2006.01)
*G01R 31/28* (2006.01)
*G01R 31/30* (2006.01)

(52) U.S. Cl.
CPC ... *G01R 31/31717* (2013.01); *G01R 31/2844* (2013.01); *G01R 31/3004* (2013.01)

(58) Field of Classification Search
CPC ............ G01R 31/2844; G01R 31/2853; G01R 31/2884; G01R 31/3004; G01R 31/31717;
(Continued)

(56) References Cited

U.S. PATENT DOCUMENTS 6,987,383 B2 * 1/2006 Kusumoto ......... G01R 31/2853
324/762.01
7,612,574 B2 * 11/2009 Fujiwara .............. G11C 29/022
714/733
(Continued)

OTHER PUBLICATIONS

Combined Search and Examination Report issued by the Great Britain Intellectual Property Office for priority United Kingdom Application No. 2104407.8, issued Dec. 30, 2021.
(Continued)

*Primary Examiner* — Vinh P Nguyen
(74) *Attorney, Agent, or Firm* — Renner, Otto, Boisselle, & Sklar, LLP.

(57) ABSTRACT

Described is a method for connectivity testing of integrated circuits. The method includes connecting an integrated circuit comprising an internal measurement component and a plurality of connection elements to an automated testing apparatus via a first common test channel connected to a first set of non-neighbouring connection elements of the plurality of connection elements and a second common test channel connected to a second set of non-neighbouring connection elements of the plurality of connection elements, different to the first set of non-neighbouring connection elements. The connection elements of the first set of non-neighbouring connection elements neighbour connection elements of the second set of non-neighbouring connection elements. The method further includes connecting a connection element of the plurality of connection elements to the internal measurement component, testing the connected connection element, and identifying a pass or fail for the connected connection element based on the testing.

19 Claims, 6 Drawing Sheets

(58) Field of Classification Search
CPC ........ G01R 31/318555; G01R 31/2856; G01R 31/31715; G01R 31/2843; G01R 31/311; G06F 21/86; H01L 23/481; H01L 2225/06541
See application file for complete search history.

(56) References Cited

U.S. PATENT DOCUMENTS

| | | | |
|---|---|---|---|
| 8,140,900 B2* | 3/2012 | Yang | G01R 31/31713 714/27 |
| 8,826,086 B2* | 9/2014 | Hook | G11C 29/56016 714/734 |
| 9,086,451 B2* | 7/2015 | Wada | G01R 31/318566 |
| 9,442,151 B2* | 9/2016 | Tubul | G01R 31/66 |
| 11,372,056 B2* | 6/2022 | Tran | G01R 31/2853 |
| 2004/0199838 A1 | 10/2004 | Rutkowski | |
| 2007/0080704 A1 | 4/2007 | Park | |
| 2009/0096476 A1* | 4/2009 | Koyama | G01R 31/31715 326/16 |
| 2009/0201042 A1 | 8/2009 | Sellathamby | |

OTHER PUBLICATIONS

International Search Report and Written Opinion issued for priority International Application No. PCT/EP2022/057951, mailed Jun. 20, 2022.

\* cited by examiner

FIG. 5

# INTEGRATED CIRCUIT TESTING METHOD AND SYSTEM

This application is a national phase of International Application No. PCT/EP2022/057951 filed Mar. 25, 2022, which claims priority to United Kingdom Application No. 2104407.8, filed Mar. 29, 2021, each of which is hereby incorporated herein by reference in its entirety.

FIELD

The present disclosure relates to the field of integrated circuits, and more specifically to integrated circuit production testing.

BACKGROUND OF THE INVENTION

An integrated circuit (IC) is a component typically comprising a number of electronic circuits, such as resistors, diodes and transistors, placed on a semiconductor substrate (e.g., such a silicon). By definition, an IC is one in which some or all of the circuit elements are inseparably associated and electronically interconnected so that it is considered indivisible for the purposes of construction and commerce. ICs are typically formed via a three-step process involving the steps of photolithography, deposition, and etching. Using this process, the resulting ICs usually are smaller, faster and cheaper than equivalent circuits formed from discrete components. Typically, when constructed, each IC has a number of pins (which are metal/conductive legs extending from the IC package) or pads (flat metal/conductive areas to which wires, often called bonding wires, can be connected) which allow connection to other discrete electrical components external to the IC and thus integration with other circuits of electronic devices. ICs are widely used in many electronic devices today including computers, mobile phones, calculators, digital watches, etc.

Traditionally in IC production testing one would have to connect each single pin or pad of the device to an Automated Test Equipment (ATE) testing device, external to the IC, to perform various connectivity tests to see that the IC is working as expected, e.g., by testing various components/connection paths through the IC. ATE platforms are expensive and parallelism is limited by the number of tester channels on the ATE and pins on the IC, meaning that ATE testing can be a time consuming process.

Many functional tests can be done by adding Built-In Self-Test (BIST) capability into the IC, but at some point, the actual connection to the pad and/or pin must be tested by an external apparatus (ATE).

Thus, there is therefore a desire to increase parallelism in IC production testing to reduce production/testing time and costs.

SUMMARY OF THE INVENTION

According to a first aspect of the invention there is provided a method for connectivity testing of integrated circuits, the method comprising: connecting an integrated circuit comprising an internal measurement component and a plurality of connection elements to an automated testing apparatus via a first common test channel connected to a first set of non-neighbouring connection elements of the plurality of connection elements and a second common test channel connected to a second set of non-neighbouring connection elements of the plurality of connection elements, different to the first set of non-neighbouring connection elements, wherein connection elements of the first set of non-neighbouring connection elements neighbour connection elements of the second set of non-neighbouring connection elements; connecting a connection element of the plurality of connection elements to the internal measurement component; testing the connected connection element; and identifying a pass or fail for the connected connection element based on the testing.

According to a second aspect of the invention there is provided a system for connectivity testing of integrated circuits, the system comprising: an automated test apparatus for performing connectivity tests of integrated circuits, said integrated circuits comprising an internal measurement component and a plurality of pins, wherein each connection element of the plurality of connection elements is connectable to the internal measurement component; a first common test channel for connecting the automated testing apparatus to a first set of non-neighbouring connection elements of the plurality of connection elements; a second common test channel for connecting the automated testing apparatus to a second set of non-neighbouring connection elements of the plurality of connection elements, different to the first set of non-neighbouring connection elements, wherein connection elements of the first set of non-neighbouring connection elements neighbour connection elements of the second set of non-neighbouring connection elements.

According to a third aspect of the invention there is provided an adaptor for use with an system for connectivity testing of integrated circuits, said integrated circuits comprising an internal measurement component and a plurality of connection elements, wherein each connection elements of the plurality of connection elements is connectable to the internal measurement component, the adaptor comprising: a first common test channel configured to connect a first set of non-neighbouring connection elements of the plurality of connection elements to a first tester channel of an automated test apparatus for performing connectivity tests; a second common test channel configured to connect a second set of non-neighbouring connection elements of the plurality of connection elements a second tester channel of an automated test apparatus for performing connectivity tests, different to the first set of non-neighbouring connection elements, wherein connection elements of the first set of non-neighbouring connection elements neighbour connection elements of the second set of non-neighbouring pins.

According to a fourth aspect of the invention there is provided an integrated circuit for use with the system of the second aspect or the adapter of the third aspect, wherein the integrated circuit comprises at least one internal measurement component and a plurality of connection elements, wherein each connection element of the plurality of connection elements is connectable to the internal measurement component.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

Broadly speaking, the present disclosure relates to a system for testing integrated circuits. The system comprises an integrated circuit having a plurality of pins or pads (more generally referred to herein as an "connection element" for allowing connection of the integrated circuit to another electrical component), where each connection element of the plurality of connection elements is connectable to an internal measurement component. The system also comprises a first common test channel connected to a first set of non-neighbouring connection elements of the plurality of connection elements, and a second common test channel connected to a second set of non-neighbouring connection elements of the plurality of connection elements, different to the first set of non-neighbouring connection elements; wherein connection elements of the first set of non-neighbouring connection elements neighbour connection elements of the second set of non-neighbouring connection elements. In some examples, the first common test channel and the second common test channel are part of the automated test equipment (or, more generally, an apparatus for performing connectivity tests). In some examples, an adaptor comprises the first common test channel and the second common test channel and as such is configured to connect the automated testing apparatus to the integrated circuit.

In some examples, each connection elements is connected to its respective common test channel through an individual resistor.

Figure 4:
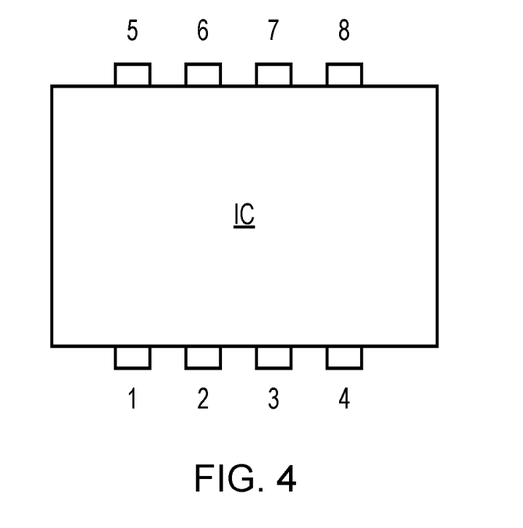
FIG. 4 schematically illustrates an example integrated circuit with a numbered arrangement of pins.

By the term "connection elements of the first set of non-neighbouring connection elements neighbour connection elements of the second set of non-neighbouring connection elements", it is meant that connection elements are alternatively connected to either the first common test channel or the second common test channel. It will be appreciated that for a typical integrated circuit the arrangement of connection elements will be pseudo one-dimensional such that each connection element typically has at most two neighbours. For example, in common IC design, a plurality of pins may be arranged around a periphery of the IC. In a particular example, the IC may be an 8-pin IC having a broadly rectangular in shape (when viewed from above) with four pins (or legs) sequentially extending from the periphery of the IC along the longer sides of the rectangular shape. That is, pins 1 to 4 may be present on one side of the IC and pins 5 to 8 may be present on the other side of the IC. Such an example IC is shown in FIG. 4. In this regard, pin 2 is the neighbour of pin 1, pins 1 and 3 are the neighbours of pin 2; pins 2 and 4 are the neighbours of pin 3, pin 4 is the neighbour of pin 3, etc. Additionally, it will be appreciated that while pins 5 to 8 of FIG. 4 are present on the other side of the IC, a neighbouring relationship with the pins 1 to 4 can still be defined (for example, pin 5 is a neighbour of pin 1 and pin 8 is a neighbour of pin 4). It will be appreciated that in some examples, an IC can be provided with pins on 1 side of a shape, or on more than 2 sides of a shape (for example pins may be provided on 4 sides of a rectangular IC). In examples, pins are alternatively connected to either the first or second common testing channel. In other words, every other pin of the plurality of pins is connected to a different common testing channel. The purpose of connecting in the manner described above is to allow the provision of a different signal to every other physical pin.

By connecting every other connection element of the integrated circuit to a common tester channel and by having a BIST capability implemented to be able to connect each of the integrated circuit pins to an internal measurement component it is possible to test the connectivity of the internal circuitry of the integrated circuit. Advantageously, the present disclosure describes a way to combine integrated circuit BIST with a limited number of ATE tester channels to test the connectivity to most integrated circuit connection elements and, in doing so, increase the parallelism in production tests to reduce production time and costs.

Figure 1A:
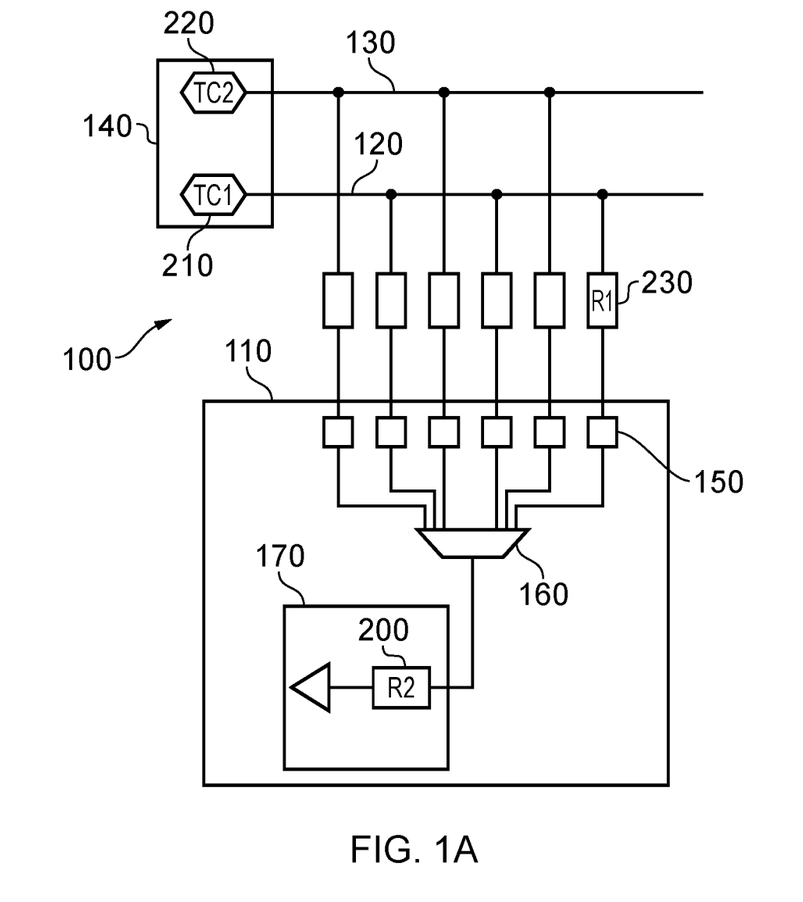
FIG. 1A schematically illustrate a system for connectivity testing of integrated circuits in accordance with the certain embodiments of the invention.

FIG. 1A schematically shows a system 100 for connectivity testing of integrated circuits 110 in accordance with the principals of the present disclosure. The system 100 is represented, schematically, in plan view. The system 100 comprises an integrated circuit 110, a first common testing channel 120, a second common testing channel 130, and automated testing apparatus 140.

The integrated circuit 110 of FIG. 1A comprises a plurality of connection elements 150 which in this example each comprise pins for electrically connecting the integrated circuit 110 to one or more other components (although it should be appreciated that connection elements 150 may alternatively include pads and/or a combination of pins and pads), one or more multiplexers 160, and one or more internal measurement components 170. As used herein, the term internal measurement component encompasses any component of the integrated circuit which can be used to obtain measurements of parameters of the integrated circuit, e.g., as part of a test routine. In the foregoing, the internal measurement component 170 is a component configured to provide built-in self-test functionality, and may herein be referred to as BIST component 170.

Figure 1B:
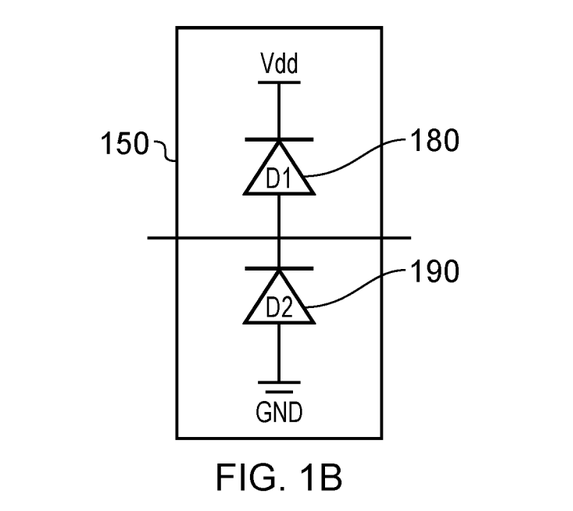
FIG. 1B illustrates a connection element for use in the system of FIG. 1A in accordance with certain embodiments of the invention.

FIG. 1B schematically shows one of the connection elements 150 for use in the system of FIG. 1A in more detail. The connection elements 150 shown in FIG. 1A are referred to herein as pins 150 for simplicity. Each of the pins 150 includes the first and second diodes 180, 190. That is to say, the first and second diodes 180, 190 are integrally formed with the pin that is provided to connect the integrated circuit 110 to other electrical components. In other implementations, however, the first and second diodes 180, 190 may be provided separate from, but associated with, each pin 150. For instance, each pin 150 may electrically couple to respective first and second diodes 180, 190 prior to coupling to the multiplexer 160.

In normal use of the integrated circuit 110, the first and second diodes are provided for safety reasons (e.g., to prevent overvoltage conditions), and so each pin 150 is provided with its own set of diodes 180, 190. However, in accordance with the present disclosure, the first and second diodes 180, 190 are further used for pin protection diode tests used to ascertain, during a testing procedure, whether the pins and/or the integrated circuit 110 is functioning correctly (or more specifically, within certain tolerances).

As shown in FIG. 1B, each connection element 150 includes a first diode "D1" 180 connected to a first power rail, the first power rail having a potential difference with respect to the ground of "Vdd". The first diode 180 has a first threshold voltage. In some examples the threshold voltage of the first diode is in the range of 0.1 V to 1.5 V and preferably has a value equal to 0.7 V. The first diode 180 is forward biased towards the power rail. As also shown in FIG. 1B, each connection element 150 comprises a second diode "D2" 190 connected to the ground rail GND. The second diode 190 has a second threshold voltage. In some examples the threshold voltage of the second diode is in the range of 0.1 V to 1.5 V and preferably has a value equal to 0.7 V. The second diode 190 is forward biased away from the ground rail. In some examples, the first threshold voltage of first diode 180 and the second threshold voltage of the second diode 190 are comparable (e.g. approximately the same). For example the first diode 180 and the second diode 190 can both have a threshold voltage of 0.7V. In some examples, the threshold voltages of the first diode 180 and the second diode 190 differ (e.g. the difference in voltage of the first diode 180 and the second diode 190 can differ by a voltage value greater than 0.2 V).

That is, the first and second diodes D1 and D2 are coupled between the power rail Vdd and ground and respectively couple to the input of the multiplexer 160 (described below). FIG. 1A shows a multiplexer 160 configured to connect pins of the plurality of pins 150 to a BIST component 170 for connectivity testing. The multiplexer 160 is associated with a respective BIST component 170 in a one-to-one relationship, and effectively functions as a switch allowing each of the pins coupled to the multiplexer to be connected in turn to a BIST component 170 under the influence of a specific control signal or the like (e.g., from a not shown controller).

Figure 5:
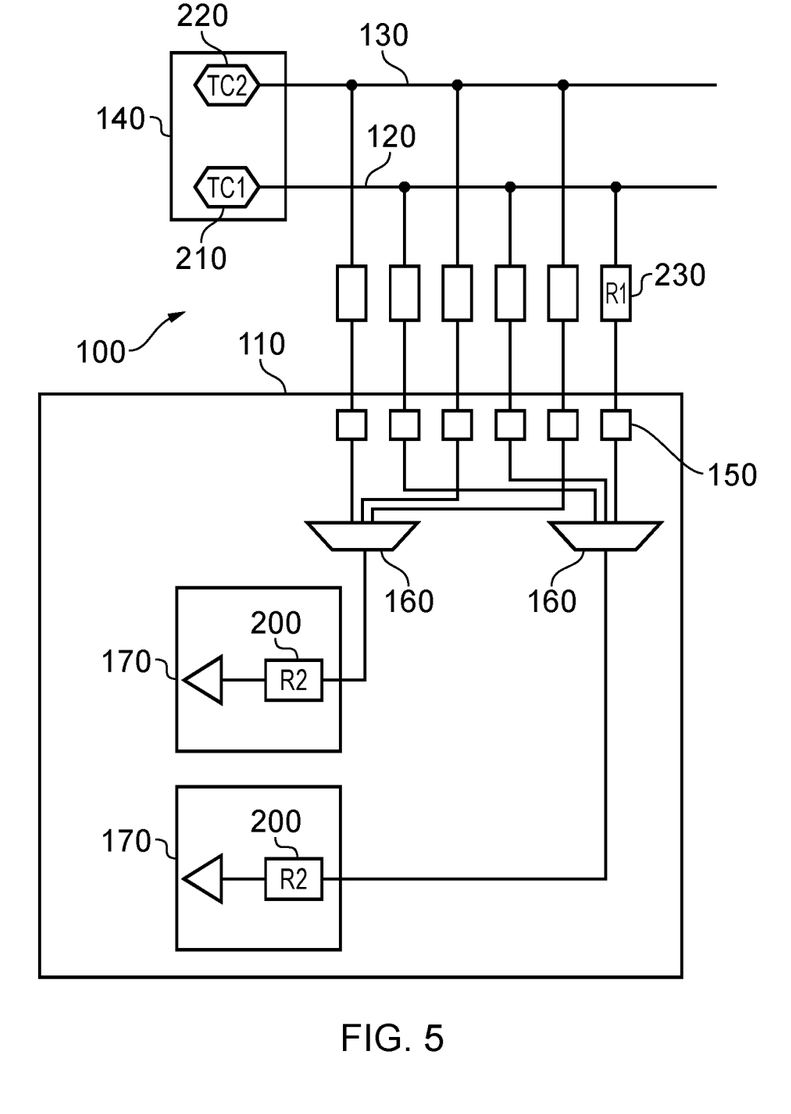
FIG. 5 schematically illustrate a system for connectivity testing of integrated circuits in accordance with the another embodiment of the invention comprising multiple multiplexers and multiple internal measurement components.

As shown in FIG. 1A, one multiplexer 160 is shown and configured to couple each of the plurality of pins 150 to the BIST component 170. However, it should be appreciated that a plurality of BIST components 170 and a plurality of multiplexers 160 may alternatively be provided within the integrated circuit 110. FIG. 5, which is largely identical to FIG. 1A, shows an example of a system comprising more than one multiplexer (e.g. FIG. 5 shows a system comprising two multiplexers 160) with each multiplexer 160 connected to a different subset of the plurality of pins 150. For example, as shown in FIG. 5, each multiplexer 160 may be connected to every other pin 150 of the plurality of pins (in other words alternate pins of the plurality of pins 150). More broadly, each multiplexer 160 is configured to select an individual pin of the subset of pins of the plurality of pins 150 to which the multiplexer 160 is connected, and to connect the individual pin to the BIST component 170 associated with the particular multiplexer 160, such that the BIST component 170 is able to test the selected pin.

Accordingly, in the example of FIG. 5, at any given time, a maximum of two of the pins 150 are connected to the two BIST components 170, meaning that the two pins 150 may be tested individually by the respective BIST component 170, but simultaneously. As compared to the system in FIG. 1A, the system of FIG. 5 takes approximately half the time to test all the pins of the plurality of the pins 150 (as two pins can be tested at any given time). Therefore, multiplexers 160 enable a balance to be struck between the cost and size of the integrated circuit 110 and the total time period required to test each of the pins. For a given number of pins 150 to be tested, increasing the number of BIST components 170 reduces the total test time (as more pins 150 can be tested simultaneously) but increases the size (footprint) and cost of the integrated circuit 110. In FIG. 5, it can be seen that a first multiplexer 160 allows each of the pins 150 coupled to the first common test channel 210 to be coupled in turn to a first BIST component 170 (representing a subset of the plurality of pins) while a second multiplexer 160 allows each of the pins 150 coupled to the second common test channel 220 to be coupled in turn to a second BIST component 170 (representing another subset of the plurality of pins). However, the way in which the pins are coupled or able to be coupled to the BIST components 170 may vary depending on the specific application at hand.

Turning back to FIG. 1A, the integrated circuit 110 comprises a number of rails including power supply rails (e.g. a positive power supply rail and a negative power supply rail) and a ground rail (GND). Other power rails may be provided in other implementations. Dedicated pins on the IC may be provided which are respectively coupled to the various rails. In normal use, the power supply rails may be coupled to a power source and respectively supply power to the IC.

In some examples, the integrated circuit 110 is configured to store the values (e.g. results or measurements) of any and/or all testing using the BIST components 170 in a memory (not shown). The values stored in the memory, relating to the results or measurements obtained by the BIST components 170 can be read out at a later time. For example they may be read out by a tester, or a system such as a quality control system. In other words, a memory may be used to facilitate a multi step process in which, testing is performed in a first step, and then analysis of the test results is performed in a second step.

In some examples, the integrated circuit is configured to send the results from the BIST components 170 to a tester or system (e.g. a quality control system) via any supported communication protocol. The transmission of results or measurements from the integrated circuit to the tester or system can be facilitated by one or more output pins. The one or more pins may be different (i.e. in addition to) to the pins used for testing such as the power rails, but do not have to be. For example, the integrated circuit can include a dedicated output pin such that, during testing, an output of the integrated circuit 110 (more specifically the BIST component 170) can be measured using the output pin. Such an output is typically is measured as a current or a voltage with respect to a ground (not necessarily the ground rail). The output pin may be one of the power rails; for example, during testing the IC is provided with power using a positive power rail and the output of the BIST component 170 is obtained via the negative power rail. The value of the output indicates whether the reading is a pass or a fail. For example a high value of voltage can indicate a pass, while a low value of voltage (e.g. close to ground) can indicate a fail, or vice versa.

Returning to FIG. 1A, in some examples, the BIST component 170 comprises an internal resistor 200, labelled as R2, connected to an output (e.g. an output pin) of the integrated circuit 110. In some examples, R2 has a resistance in the range of 1 kohm (k$\Omega$) to 80 kohm (k$\Omega$), and preferably 8 kohm (k$\Omega$).

The automated testing apparatus 140 (e.g. automated testing equipment) comprises a first testing channel 210, labelled TC1, and a second testing channel 220, labelled TC2. The first testing channel 210 is connected to the first common testing channel 120, and the second testing channel is connected to the second common testing channel 130. In some examples the automated testing apparatus 140 can also be connected to the output of the integrated circuit 110. The output can be used for communication between the automated testing apparatus 140 and the integrated circuit 110. For example, the automated testing apparatus 140 can measure a voltage or current of the integrated circuit 110 via the output (which may be referred to herein as a "communication pin") or can receive a signals indicative of measured voltages or current via any supported communications protocol using the output.

It is noted that the communication pin used for communication between the integrated circuit 110 and the automated testing apparatus 140 cannot be tested using the method described below (i.e. it cannot be both a pin connected to one of the first and second common testing channels and a output pin). Different methods may be required for testing the communication pin and as such the communication pin is not to be considered as one of the plurality of pins that are coupled to one of the first and second common tester channels.

As shown in FIG. 1A, the first and second common testing channels 120, 130 comprise a plurality of resistors 230 ("R1"), each of which is positioned between (and thus connects) the respective common testing channel and one of the pins of the plurality of pins 150. In some examples, the plurality of resistors 230 may not be present and instead the first and second common testing channels 120, 130 can be connected to the plurality of pins through a connection that does not involve a resistor, and/or a resistor may be common to each of the first channels 120, 130. In some of these examples, wiring or electrical pathways for connecting to the pins can be selected or manufactured to provide a specific resistance (e.g. R1) rather than having a distinct resistor component provided as part of the first and/or second common testing channels. In some examples, R1 has a resistance in the range of 1 kohm (kΩ) to 1 Mohm (kΩ), and preferably 100 kohm (kΩ). The resistances of R1 and R2 are selected to balance the resistance between R1 and R2 in a way that the BIST circuit is able to determine the difference between a pass and a fail in the connectivity tests.

In some examples, testing the integrated circuit connectivity involves performing a direct voltage or current measurement between the integrated circuit 110 and the automated testing equipment 140, and performing one or more integrated circuit pin protection diode tests (e.g. D1 180 and/or D2 190). In addition, in some examples, the testing may also check that there is no short between neighbour pins and to the power supply and ground rails. The tests to be performed may be based on a particular compliance standard that the integrated circuit may be expected to meet. As described above, each pin of the plurality of pins 150 can be tested by the automated testing equipment 140 in conjunction with the BIST component 170, with the multiplexer 160 connecting each pin of the plurality of pins 150 to which it is connected in turn to a respective BIST component 170 for connectivity testing. For example, a first multiplexer 160 can connect each pin, of a first subset of pins of the plurality of pins 150, in turn (e.g. sequentially) to a first BIST component 170 to which the first multiplexer 160 is connected. As described above, it will be appreciated that where there are multiple multiplexers 160 (e.g. two as shown in FIG. 5), each multiplexer 160 can select or connect individual pins of the subset of pins to which it is connected with a respective BIST component 170 to which the multiplexer is connected.

Figure 1C:
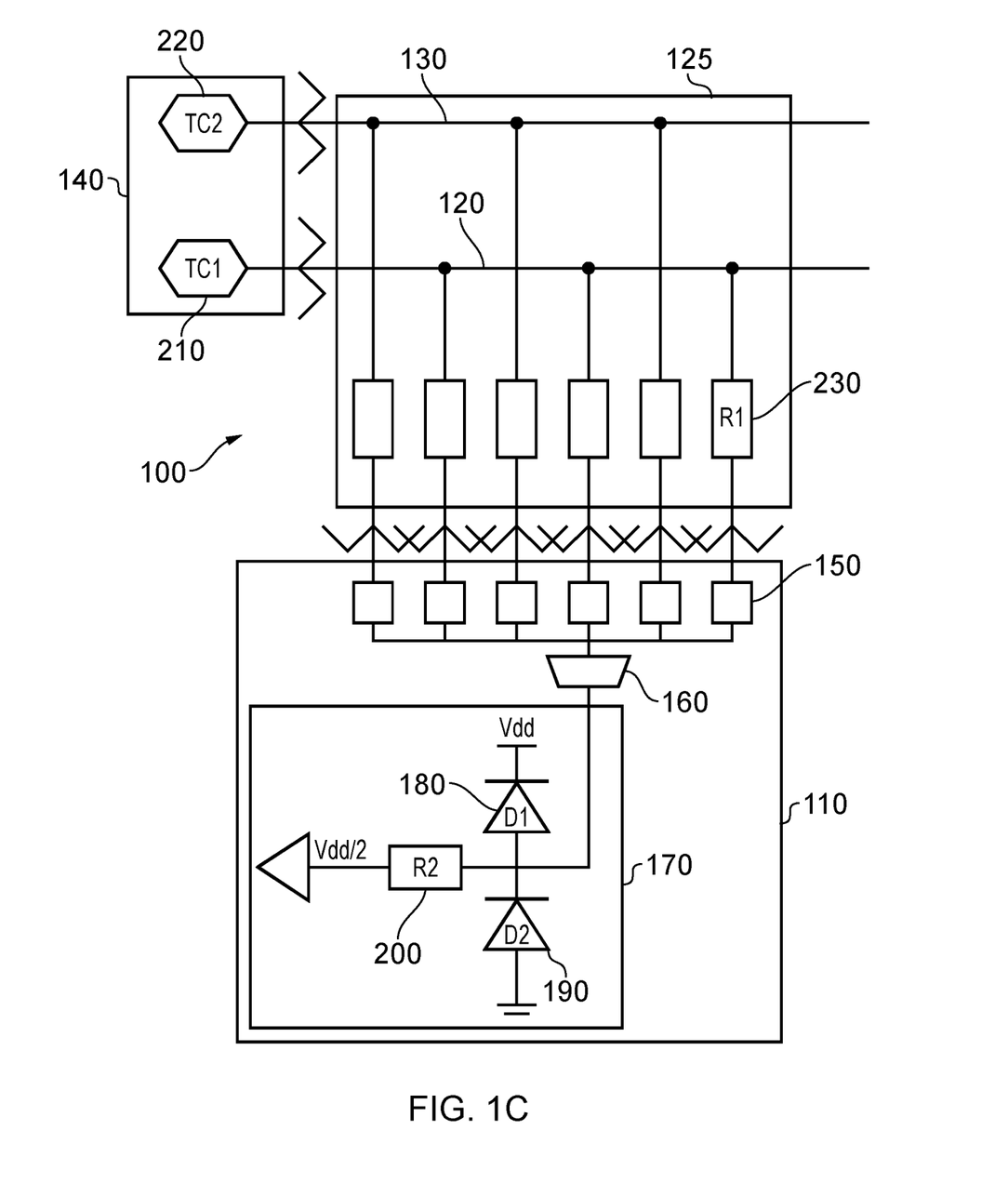
FIG. 1C schematically illustrates an adaptor for use in the system of FIG. 1A in accordance with certain embodiments of the invention.

While in some examples, for instance in accordance with FIG. 1A, the automated testing equipment 140 comprises the first common testing channel 120 and the second common testing channel 130. However, in other examples, an adaptor 125 is provided for connecting the automated testing equipment 140 to the integrated circuit 110. Such an arrangement is shown in FIG. 1C. Like components in FIG. 1C are shown with the same reference sign as used in FIG. 1A, and a description thereof is omitted for conciseness. In addition, for clarity, the connection lines from each of the pins 150 to the multiplexer 160 are shown in a condensed form, but it should be appreciated that there exist individual connection lines between each of the respective pins 150 and the multiplexer 160, as shown in FIG. 1A.

FIG. 1C schematically illustrates an adaptor 125 for use in the system of FIG. 1A in accordance with the disclosure. Such an adaptor 125 comprises the first common test channel 120 and the second common test channel 130 and is configured to connect the automated testing apparatus 140 to the integrated circuit. The adapter 125 effectively couples to the first and second common testing channels 120 and 130 to the first and second testing channels 210 and 220 of the automated testing equipment 140, and comprises an arrangement which allows for the first testing channel 210 to couple to the first set of non neighbouring pins (e.g. connection elements) via the first common testing channel 120, and couples the second testing channel 220 to a second set of non-neighbouring pins (e.g. connection elements) via the first common testing channel 130. The adaptor 125 may also comprise the plurality of resistors 230 ("R1"), each of which is positioned on a connection for connecting a respective common testing channel with a pin of the plurality of pins 150. Thus, broadly speaking, the adapter 125 is a component which may be retrofit to existing automated testing equipment to allow for the pins 150 of an integrated circuit to be coupled in the manner described in FIG. 1A. Different adapters 125 may be used for different integrated circuits (i.e., with a different number of pins 150 to test).

The following describes a set of example test conditions for the various tests to be performed on each pin of the integrated circuit. It should be appreciated that the values given are provided purely for the purposes of providing a concrete example, and should not be taken to describe exclusive testing conditions. For example, the voltages or current supplied to an integrated circuit is constrained by minimum and maximum operating limits, outside of which the integrated circuit is either not reliable or is susceptible to failure. As such, appropriate values can be selected for a particular integrated circuit (e.g. based on type) and applied for the purposes of testing.

Example Test Conditions an input voltage "Vdd" on a power supply rail of the integrated circuit equal to 3.3 V;

a ground "GND" of the integrated circuit equal to 0 V (although this could be set to any suitable voltage value depending on the IC power requirements);

a first voltage "$V_1$" equal to 5V on the first testing channel 210 "TC1", provided by the automated testing equipment 140;

a second voltage "$V_2$" equal to −1.7V on the second testing channel 220 "TC2", provided by the automated testing equipment 140;

a first resistance "R1" equal to 1 kohm (kΩ) for each of the plurality of resistors 230;

a second resistance for the resistor "R2" 200 equal to 8 kohm (kΩ)

a first threshold voltage "$VTH_{D1}$" for the first diode "D1" equal to 0.7 V.

a second threshold voltage "$VTH_{D2}$" for the second diode "D2" equal to −0.7 V.

For the above example parameters and for pins connected to TC1, in normal operation the current through R2 will have a value of 294 µA and the current through R1 will have a value of 1 mA. The value of the current through R2 can be calculated using the formula: $I_{R2}=(Vdd+VTH_{D1}-Vdd/2)/R2=(3.3\ V+0.7\ V-1.65\ V)/8\ kohm=294\ µA$. The value of the current through each resistor R1 can be calculated using the formula: $I_{R1}=(V_1-Vdd+VTH_{D1})/R1=(5V-3.3V+0.7V)=1\ V/1\ kohm=1\ mA$.

For the above example parameters and for pins connected to TC2, in normal operation the current through R2 will have a value of −294 µA and the current through R1 will have a value of 1 mA. The value of the current through R2 can be calculated using the formula: $I_{R2}=(GND-VTH_{D2}-Vdd/2)/R2=(-0.7\ V-1.65\ V)/8\ kohm=-294\ µA$. The value of the current through R1 can be calculated using the formula: $I_{R1}=(V_2-GND-VTH_{D1})/R1=(-1.7V-0V-(-0.7V))=-1\ V/1\ kohm=-1\ mA$.

It should be appreciated that the values for the current across R1 and R2 given above represent idealised values based on theoretical calculations. These define the theoretically expected currents accordingly, but in practical terms the measured currents may vary slightly from the values shown above even when the pins are considered to be operating normally.

It should also be appreciated that the first and second voltages applied to TC1 210 and TC2 220 may be reversed such that the second voltage is applied to TC1 and the first voltage is applied to TC2. Additionally, the values attributed to voltages $V_1$ and $V_2$ are examples only and in other situations the voltages $V_1$ and $V_2$ may be set to other values. For example, the values $V_1$ and $V_2$ may be set depending on the expected maximum and minimum voltages that the IC will be exposed to during operation in the associated component or apparatus the IC is to be installed in.

During testing of the integrated circuit, measures of the current over resistors R1 and R2 may be obtained (while applying the voltage $V_1$ or $V_2$ from the automated testing equipment 140) and compared to the expected values and/or ranges of values, as will be described below. The current over resistor R2 can be obtained internally of the integrated circuit (e.g., via measuring a voltage drop over resistor R2 using a suitable component, such as the BIST component 170), while the current over resistor R1 can be obtained by using the measurement of the voltage drop over resistor R2 and knowing the voltage $V_1$ or $V_2$. Other ways of obtaining the current over resistor R1 and/or resistor R2 will be apparent to the skilled person. Thus, in broad terms, testing a given pin of the plurality of pins 150 comprises applying a current and/or voltage to the integrated circuit and measuring a current and/or voltage associated with the integrated circuit.

In some examples, based on the above parameters, an open circuit test for each pin of the plurality of pins can be performed. An open circuit test determines whether an electrical path or connection exists (e.g. in that a current is able to flow) between two points. The open circuit test is passed if the current through R2=294 µA/−294 µA for pins connected to the first testing channel 210 and the second testing channel 220 respectively and is failed if the current through R2 is 0 µA for either of the pins connected to the first and second testing channel 210, 220. It should be appreciated that due to manufacturing tolerances or errors, a pass and fail condition may be based on whether the measured current falls within a certain range, e.g., a pin may be deemed to fail if the current is between ±100 µA. The values for the current across R2 given above represent idealised values based on theoretical calculations and accordingly the criteria for determining whether a pin passes or fails may be different than stated above.

In some examples, diode tests using the first and/or second diodes 180, 190 can be performed. A diode test determines whether the voltage is within a certain range. For example, a diode should prevent or somewhat inhibit the flow of current when the diode is reverse biased, and allow current to flow when the diode is forward biased, with respect to the voltages applied across the diode. The purposes of a diode test is to determine if the diodes are operating within a predefined limits (e.g. manufacturing tolerances) to establish whether the diodes are manufactured and/or installed correctly.

A diode test using the first diode 180 is performed for pins connected to TC1. The diode test using the first diode is passed if the current through R2=294 µA and is failed if the current through R2=372 µA. In the fail condition, the current through R2 can be calculated using the formula: $I_{R2}=(V_1-Vdd/2)/(R1+R2)=(5\ V-1.65\ V)/9\ kohm=372\ uA$. The values for the current across R2 given above represent idealised values based on theoretical calculations and accordingly the criteria for determining whether a pin passes or fails may be different than stated above.

A diode test using the second diode 190 is performed for pins connected to TC2. The diode test using the second diode is passed if the current through R2=−294 µA and is failed if the current through R2=−372 µA. In the fail condition, the current through R2 can be calculated using the formula: $I_{R2}=(V_2-Vdd/2)/(R1+R2)=(-1.7\ V-1.65\ V)/9\ kohm=-372\ uA$. The values for the current across R2 given above represent idealised values based on theoretical calculations and accordingly the criteria for determining whether a pin passes or fails may be different than stated above.

In some of these examples, the automated test equipment 140 conducts a first test stage in which tests of the integrated circuit are performed with the first voltage being applied to TC1 and the second voltage being applied to TC2, and a second test stage in which tests of the integrated circuit are performed with the first voltage being applied to TC2 and the second voltage being applied to TC1. In these examples where the first and second voltages applied to TC1 210 and TC2 220 are swapped by the automated testing equipment 140 such that the second voltage is applied to TC1 and the first voltage is applied to TC2, the above mentioned test conditions (e.g. pass/fail conditions) will also be swapped. This allows first and second diode tests to be performed on both the pins connected to TC1 and the pins connected to TC2. This may be performed to verify the judgement of pass/fail in the first phase.

In some examples, the automated testing equipment 140 can test for short circuits between neighbouring pins 150. A short circuit test determines whether an electrical path or connection exists (e.g. in that a current is able to flow) between two points. As stated above, the first common test channel 120 is connected to a first set of non-neighbouring pins of the plurality of pins 150, and a second common test channel 130 is connected to a second set of non-neighbouring pins of the plurality of pins 150, different to the first set of non-neighbouring pins; wherein pins of the first set of non-neighbouring pins neighbour pins of the second set of non-neighbouring pins. This means that a short circuit between two neighbouring pins will cause a pin of the first set of non-neighbouring pins to be in electrical connection with a pin of the second set of non-neighbouring pins.

The test for short circuits between neighbouring pins is passed if the current through R2=294 µA, and is failed if the input voltage on a pin is 3.35V and the current through R2 is 213 µA for a given pin. The fail condition on an input voltage on a pin that has a short can be calculated using the formula: $(V_2+V_1)/2=(-1.7 \text{ V}+5.0 \text{ V})/2=3.35 \text{ V}$. The fail condition on the current through R2 can be calculated using the formula: $I_{R2}=(3.35-Vdd/2)/R2=(3.35 \text{ V}-1.65 \text{ V})/8 \text{ kohm}=213 \text{ µA}$.

In some examples, the automated testing equipment 140 can test for a short from a pin to the Vdd rail. For channels connected to TC1, the test for a short from a pin to the Vdd rail is passed if the current through R2 is equal to 294 µA and is failed if the input voltage on the pin is equal to Vdd and the current through R2 is equal to 206 µA. For channels connected to TC2, the test for a short from a pin to the Vdd rail is passed if the current through R2 is equal to −294 µA and is failed if the input voltage on the pin is equal to Vdd and the current through R2 is equal to 206 µA. The fail condition current through R2 can be calculated using the formula: $I_{R2}=(Vdd-Vdd/2)/R2=(3.3 \text{ V}-1.65 \text{ V})/8 \text{ kohm}=206 \text{ µA}$.

In some examples, the automated testing equipment 140 can test for a short from a pin to the ground rail. For channels connected to TC1, the test for a short from a pin to the ground rail is passed if the current through R2 is equal to 294 µA and is failed if the input voltage on the pin is equal to GND and the current through R2 is equal to −206 µA. For channels connected to TC2, the test for a short from a pin to the Vdd rail is passed if the current through R2 is equal to −294 µA and is failed if the input voltage on the pin is equal to Vdd and the current through R2 is equal to −206 µA. The fail condition current through R2 can be calculated using the formula: $I_{R2}=(GND-Vdd/2)/R2=(0 \text{ V}-1.65 \text{ V})/8 \text{ kohm}=-206 \text{ µA}$.

As such a pin of the plurality of pins 150 can be tested by the automated testing equipment 140 in conjunction with the BIST component 170, by the multiplexer 160 connecting the pin of the plurality of pins 150 to the BIST component 170 for connectivity testing. The automated testing equipment 140 can check the current through R2 to determine whether the connected pin passes or fails any of the tests described above.

For example, based on the above parameters, a pin connected to TC1 210 through the first common testing channel 120 can be considered to pass the open circuit test, first diode test, short circuit to a neighbouring pin test, short circuit to the Vdd rail test, and short circuit to the ground rail test if the current through R2 is equal to 294 µA. The pin can be considered to have failed the open circuit test if the current is 0 µA, to have failed the first diode test if the current is 372 µA, to have failed the short circuit to a neighbouring pin test if the current is 213 µA, short circuit to the Vdd rail test if the current is 206 µA, and short circuit to the ground rail test if the current is −206 µA. While the values above indicate ideal values related to the specific example stated above, any of the conditions above can be considered to be met if the current falls within a range surrounding an expected value. In some examples, the range in which a condition is considered to be at least +/−20%, at least +/−10%, and at least +/−5%. The particular range can be chosen dependent on the integrated circuit to be tested.

Similarly, a pin connected to TC2 220 through the second common testing channel 130 can be considered to pass the open circuit test, first diode test, short circuit to a neighbouring pin test, short circuit to the Vdd rail test, and short circuit to the ground rail test if the current through R2 is equal to −294 µA. The pin can be considered to have failed the open circuit test if the current is 0 µA, to have failed the second diode test if the current is −372 µA, to have failed the short circuit to a neighbouring pin test if the current is 213 µA, short circuit to the Vdd rail test if the current is 206 µA, and short circuit to the ground rail test if the current is −206 µA. As stated above, while the values above indicate ideal values related to the specific example stated above, any of the conditions above can be considered to be met if the current falls within a range surrounding an expected value. In some examples, the range in which a condition is considered to be at least +/−20%, at least +/−10%, and at least +/−5%. The particular range can be chosen dependent on the integrated circuit to be tested.

In some examples, the automated testing equipment 140 can output a pass or fail indication for the tested pin, either as that pin is being tested or after the testing cycle is complete. In some examples, based on the testing of each pin of the plurality of pins 150, the automated testing equipment 140 can output a pass or fail indication for the integrated circuit based on the passing or failing of one or more of the plurality of pins 150. In other examples, after a pin of an integrated circuit 110 has failed, the automated testing equipment 140 will not test any further pins of the integrated circuit 110. Due to the nature of ICs, it is highly likely that if one pin is considered to fail, the whole IC is therefore not suitable for use or sale. Thus, the output from the automated testing equipment may indicate whether at least one pin of the integrated circuit failed at least one of the tests. In some examples the output is a visual or audio output, although any suitable mechanism for communicating the pass or failure of a pin/integrated circuit is considered in accordance with the principles of the present disclosure. In some examples, the output is a data item that is transmitted or otherwise provided to a computing unit.

In some examples, after testing of a pin, the multiplexer 160 can connect a different pin of the plurality of pins 150 to the BIST component 170. For example, the multiplexer 160 may sequentially select pins of the plurality of pins 150 for connection to the BIST component 170.

It will be appreciated that while the system 100 depicted in FIGS. 1A, 1B, and 1C show particular relationships (e.g. connections and associations) between various components, other arrangements are possible without departing from the scope of the invention. For example, whilst the FIG. 1B depicts that each pin 150 comprises a first diode 180 and second diode 190; in some other example systems, the first diode 180 and second diode 190 can be part of a BIST component 170, instead of the pins 150, and hence are shared between a plurality (or subset) of pins to which that BIST component 170 is connected through a multiplexer 160. Alternatively, the diodes 180, 190 may be a standalone component coupled between the input of the multiplexer 160 and each of the pins 150, or between the output of the multiplexer 160 and the BIST component 170. Different electrical arrangements of the aforementioned electrical components which are able to achieve the same effect will be apparent to the skilled person.

Figure 2:
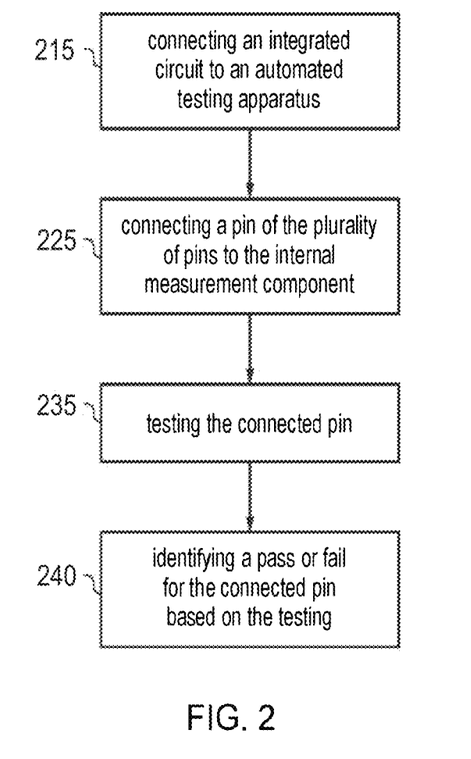
FIG. 2 illustrates a method for connectivity testing of integrated circuits in accordance with the certain embodiments of the invention.

FIG. 2 is a flow diagram showing the method for connectivity testing of integrated circuits 110 according to aspects of the present disclosure. The method begins at step 215 with connecting an integrated circuit to an automated testing apparatus 140. As described above an integrated circuit in accordance with the present disclosure comprise a BIST component 170 and a plurality of pins 150. The integrated circuit is connected to the automated testing equipment via a first common test channel 120 connected to a first set of non-neighbouring pins of the plurality of pins and a second common test channel 130 connected to a second set of non-neighbouring pins of the plurality of pins, different to the first set of non-neighbouring pins. As described above the pins of the first set of non neighbouring pins neighbour pins of the second set of non-neighbouring pins.

At step 225, the method continues with connecting a pin of the plurality of pins to the BIST component. As stated above, a multiplexer 160 can connect each pin of the plurality of pins 150 (or each pin of the subset of the plurality of pins 150 to which the multiplexer 160 is connected, where there is more than one multiplexer 160) to the BIST component 170 for connectivity testing. For example, a first multiplexer 160 can connect each pin of a first subset of pins of the plurality of pins 150 in turn (e.g. sequentially) to a first BIST component 170. It will be appreciated that where there is more than one multiplexer 160 (e.g. two as shown in FIG. 1A), each multiplexer 160 can select or connect individual pins of the subset of pins to which it is connected with a respective BIST component 170 to which the multiplexer is connected. As such, by adding more multiplexers 160 and respective BIST components 170 it is possible to test more pins in parallel and reduce test time.

At step 235, the method continues with testing the connected pin. As such each pin of the plurality of pins 150 can be tested by the automated testing equipment 140 in conjunction with the BIST component 170.

At step 240, the method continues with identifying a pass or fail for the connected pin based on the testing. The pass or fail is identified based on testing by the automated testing equipment in conjunction with the BIST component as described above.

Figure 3:
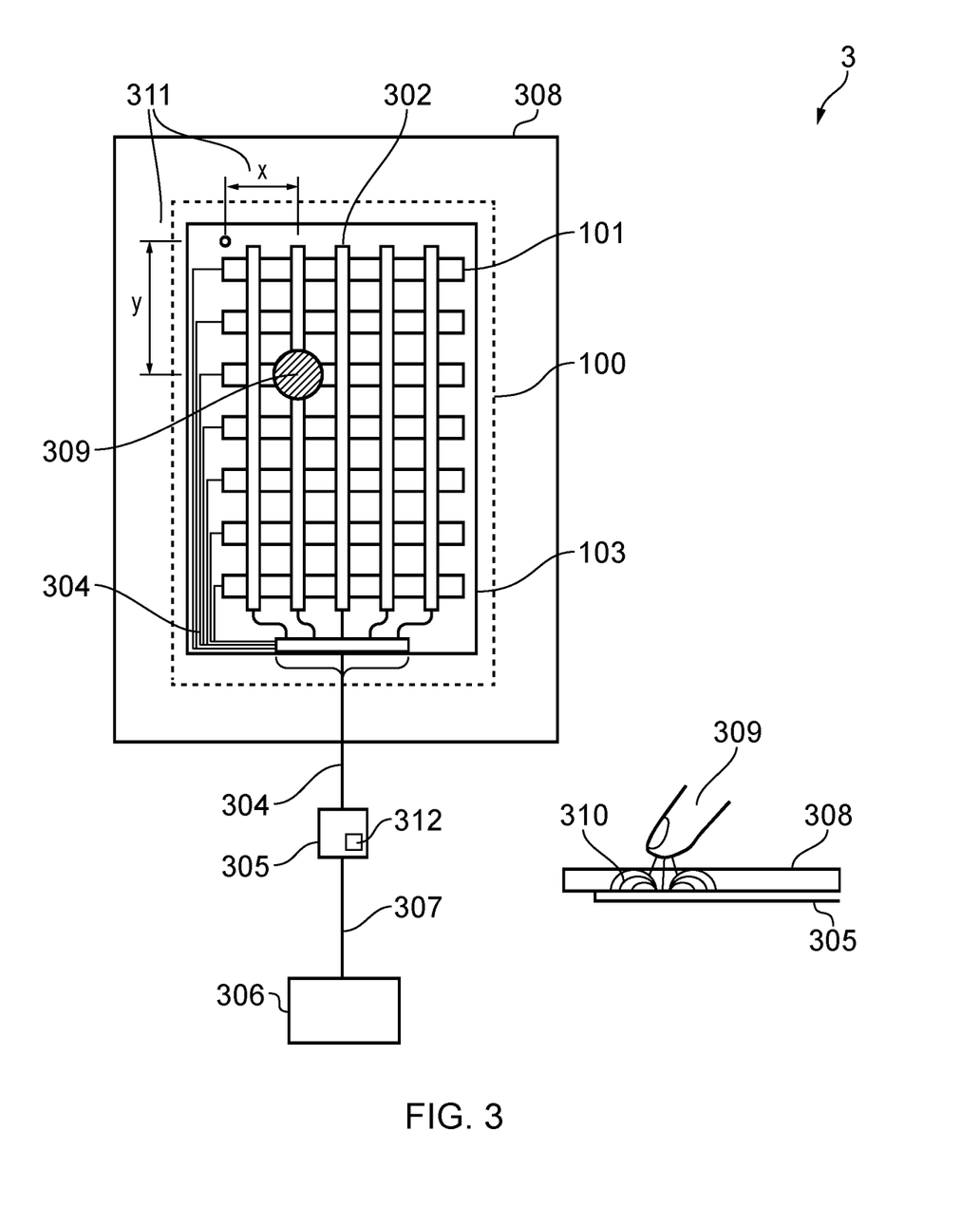
FIG. 3 schematically illustrates a touch sensitive apparatus having an integrated circuit in accordance with certain embodiments of the invention.

FIG. 3 schematically shows a touch-sensitive apparatus 3 in accordance with the principals of the present disclosure. The touch-sensitive apparatus 3 is represented in plan view (to the left in the figure) and also in cross-sectional view (to the right in the figure). The touch-sensitive apparatus is an example of an electronic device including at least one integrated circuit 110 in accordance with the present disclosure.

The touch-sensitive apparatus 3 comprises a sensor element 300, measurement circuitry 305, processing circuitry 306, and cover 308. The sensor element 300 and cover 308 may, more generally be referred to as a touch screen or touch-sensitive element of the touch-sensitive apparatus 3, while the measurement circuitry 305 and processing circuitry 306 may, more generally, be referred to as the controller of the touch-sensitive apparatus 3.

The measurement circuitry 305 and/or the processing circuitry 306 may include an integrated circuit in accordance with the integrated circuit 110 depicted in FIG. 1A. Although shown separately in FIG. 3, in some implementations, the measurement circuitry and the processing circuitry may be provided by the same integrated circuit 110. In some examples, there may be various conductors 304, 307 (e.g. wires or pins) for facilitating communication of electrical signals between components of the apparatus. Note also that the functionality provided by either of the measurement circuitry 305 and the processing circuitry 306 may be split across multiple integrated circuits 110.

The touch screen is primarily configured for establishing the position of a touch within a two-dimensional sensing area by providing Cartesian coordinates along an X-direction (horizontal in the figure) and a Y-direction (vertical in the figure). In this implementation, the sensor element 300 is constructed from a substrate 303 that could be glass or plastic or some other insulating material and upon which is arranged an array of electrodes consisting of multiple laterally extending parallel electrodes, X-electrodes 301 (row electrodes), and multiple vertically extending parallel electrodes, Y-electrodes 302 (column electrodes), which in combination allow the position of a touch 309 to be determined. To clarify the terminology, and as will be seen from FIG. 3, the X-electrodes 301 (row electrodes) are aligned parallel to the X-direction and the Y-electrodes 302 (column electrodes) are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named (in terms of X- and Y-) after their direction of extent rather than the direction along which they resolve position. The X-electrodes 301 and Y-electrodes 302 define a sensing (or sense) area, which is a region of the substrate 303 which is sensitive to touch.

In some cases, each electrode may have a more detailed structure than the simple "bar" structures represented in FIG. 3, but the operating principles are broadly the same. The sensor electrodes are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided as an alternative to a mouse in laptop computers is usually opaque, and hence can use lower cost copper electrodes and an epoxy-glass-fibre substrate (e.g. FR4).

Referring back to FIG. 3, the electrodes 301, 302 are electrically connected via circuit conductors 304 to measurement circuitry 305, which is in turn connected to processing circuitry 306 by means of a circuit conductor 307. The processing circuitry 306 interrogates the measurement circuitry 305 to recover the presence and coordinates of any touch or touches present on, or proximate to, the sensor element 300.

Generally speaking, the measurement circuitry 305 is configured to perform capacitance measurements associated with the electrodes 301, 302. The measurement circuitry 305 comprises drive circuitry 312 for generating electrical signals for performing the capacitance measurements. The measurement circuitry 305 may be coupled to various electrical components, using, for example the pins of the integrated circuit, for generating and receiving the electrical signals applied to, and received from, the sensor element 300. For instance, the integrated circuit of the measurement circuitry 305 may be provided with one or more pins controlling the components suitable for generating the electrical drive signal (e.g., the drive circuitry 312) to be applied to the sensor element, and one or more pins controlling the components suitable for receiving the electrical signal from the sensor element.

The measurement circuitry 305 outputs the capacitance measurements to the processing circuitry 306, which is arranged to perform processing using the capacitance measurements. The processing circuitry 306 may be configured to perform a number of functions, but at the very least is configured to determine when a touch 309, caused by an object such a human finger or a stylus coming into contact with (or being adjacent to) the sense area of the sensor element 300 with appropriate analysis of relative changes in the electrodes' measured capacitance/capacitive coupling.

The processing circuitry 306, as in the described implementation, may also be configured to, with appropriate analysis of relative changes in the electrodes' measured capacitance/capacitive coupling, calculate a touch position on the cover's surface as an XY coordinate 311. The processing circuitry 306 may comprise an integrated circuit comprising a number of pins for receiving inputs from the measurement circuitry 305 for performing the processing measured above.

Thus, there has been described a method for connectivity testing of integrated circuits. The method includes connecting an integrated circuit comprising an internal measurement component and a plurality of connection elements to an automated testing apparatus via a first common test channel connected to a first set of non-neighbouring connection elements of the plurality of connection elements and a second common test channel connected to a second set of non-neighbouring connection elements of the plurality of connection elements, different to the first set of non-neighbouring connection elements. The connection elements of the first set of non-neighbouring connection elements neighbour connection elements of the second set of non-neighbouring connection elements. The method further includes connecting a connection element of the plurality of connection elements to the internal measurement component, testing the connected connection element, and identifying a pass or fail for the connected connection element based on the testing. Also described is a system for connectivity testing of integrated circuits, and an adaptor for use with an system for connectivity testing of integrated circuits.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A method for connectivity testing of integrated circuits, the method comprising:
    connecting an integrated circuit comprising an internal measurement component and a plurality of connection elements to an automated testing apparatus via a first common test channel connected to a first set of non-neighbouring connection elements of the plurality of connection elements and a second common test channel connected to a second set of non-neighbouring connection elements of the plurality of connection elements, different to the first set of non-neighbouring connection elements, wherein connection elements of the first set of non-neighbouring connection elements neighbour connection elements of the second set of non-neighbouring connection elements;
    connecting a selected connection element of the plurality of connection elements to the internal measurement component;
    testing the connected connection element; and
    identifying a pass or fail for the connected connection element based on the testing.

2. The method of claim 1, wherein testing the connected connection element comprises applying a current and/or voltage to the integrated circuit and measuring a current and/or voltage associated with the integrated circuit.

3. The method of claim 2, wherein the method comprises identifying a pass if the measured current and/or voltage is inside a range of passable values; and
    wherein the method comprises identifying a fail if the measured current and/or voltage is outside of the range of passable values.

4. The method of claim 1, wherein identifying a fail comprises identifying a type of fail.

5. The method of claim 4, wherein the type of fail is one selected from a group comprising an open circuit, a short circuit between neighbouring connection elements, short circuit to a power rail, and short circuit to a ground rail, a first diode test failure, and a second diode test failure.

6. The method of claim 5, wherein when the connected connection element is one of the first set of non-neighbouring connection elements:
    an open circuit fail is selected if the current is a first value approximately equal to 0 $\mu$A;
    a short circuit between neighbouring connection elements fail is selected if the current is a second value which is less than a range of passable values and greater than 0 $\mu$A;
    a short circuit to a power rail fail is selected if the current is a third value which is less than the range of passable values and greater than 0 $\mu$A, the third value being less than the second value;
    a short circuit to a ground rail fail is selected if the current is a fourth value which is less than 0 $\mu$A and a magnitude less than the magnitude of the range of passable values;
    a first diode test fail is selected if the current is a fifth value which is greater than the range of passable values; and/or
    a second diode test fail is selected if the current is a sixth value which is less than 0 $\mu$A and having a magnitude greater than the magnitude of the range of passable values.

7. The method of claim 5, wherein when the connected connection element is one of the second set of non-neighbouring connection elements:
    an open circuit fail is selected if the current is a seventh value approximately equal to 0 $\mu$A;
    a short circuit between neighbouring connection elements fail is selected if the current is a eighth value which is greater than 0 $\mu$A and less than a magnitude of the range of passable values;
    a short circuit to a power rail fail is selected if the current is a ninth value which is greater than 0 $\mu$A and less than a magnitude of the range of passable values, the ninth value being less than the eight value;
    a short circuit to a ground rail fail is selected if the current is a tenth value which is less than 0 $\mu$A and greater than the magnitude of the range of passable values;
    a first diode test fail is selected if the current is a eleventh value which is greater than the magnitude of the range of passable values; and/or
    a second diode test fail is selected if the current is a twelfth value which is less than the range of passable values.

8. The method of claim 1, wherein the method comprising testing the plurality of connection elements sequentially.

9. A system for connectivity testing of integrated circuits, the system comprising:
    an integrated circuit comprising an internal measurement component and a plurality of connection elements, wherein each connection element of the plurality of connection elements is selectively connectable to the internal measurement component;
    an automated test apparatus for performing connectivity tests of integrated circuits;

a first common test channel for connecting the automated testing apparatus to a first set of non-neighbouring connection elements of the plurality of connection elements;

a second common test channel for connecting the automated testing apparatus to a second set of non-neighbouring connection elements of the plurality of connection elements, different to the first set of non-neighbouring connection elements, wherein connection elements of the first set of non-neighbouring connection elements neighbour connection elements of the second set of non-neighbouring connection elements.

10. The system of claim 9, wherein the first common test channel is configured to connect the first set of non-neighbouring connection elements to a first tester channel of an automated test apparatus for performing connectivity tests, and wherein the second common test channel is configured to connect the second set of non-neighbouring connection elements to a second tester channel of the automated test apparatus of automated test equipment for performing connectivity tests.

11. The system of claim 9, wherein the automated test apparatus comprises the first common test channel and the second common test channel.

12. The system of claim 9, wherein the integrated circuit comprises at least one multiplexer configured to connect one or more of the plurality of connection elements to the internal measurement component.

13. The system of claim 12, wherein the multiplexer is configured to connect each connection element of the plurality of connection elements separately to the internal measurement component in a sequence.

14. The system of claim 9, wherein the integrated circuit further comprises a first diode connected to a first power rail.

15. The system of claim 9, wherein the integrated circuit further comprises a second diode connected to a ground.

16. The system of claim 9, wherein the internal measurement component comprises a resistor connected to an output.

17. The system of claim 9, wherein the internal measurement component is a first internal measurement component, wherein the integrated circuit further comprises a second internal measurement component, and wherein at least one subset of connection elements are connectable to the first internal measurement component, and another subset of connection elements are connectable to the second internal measurement component.

18. An adaptor for use with a system for connectivity testing of integrated circuits, said integrated circuits comprising an internal measurement component and a plurality of connection elements, wherein each connection elements of the plurality of connection elements is selectively connectable to the internal measurement component, the adaptor comprising:

a first common test channel configured to connect a first set of non-neighbouring connection elements of the plurality of connection elements to a first tester channel of an automated test apparatus for performing connectivity tests;

a second common test channel configured to connect a second set of non-neighbouring connection elements of the plurality of connection elements a second tester channel of an automated test apparatus for performing connectivity tests, different to the first set of non-neighbouring connection elements, wherein connection elements of the first set of non-neighbouring connection elements neighbour connection elements of the second set of non-neighbouring connection elements.

19. An integrated circuit for use with the system of claim 9 or the adapter of claim 18, wherein the integrated circuit comprises at least one internal measurement component and a plurality of connection elements, wherein each connection element of the plurality of connection elements is selectively connectable to the at least one internal measurement component.

* * * * *